(12) United States Patent
Fujishiro

(10) Patent No.: US 8,872,443 B2
(45) Date of Patent: Oct. 28, 2014

(54) LIGHTING APPARATUS AND CONTROL CIRCUIT

(71) Applicant: Toki Corporation, Tokyo (JP)

(72) Inventor: Kenji Fujishiro, Tokyo (JP)

(73) Assignee: Toki Corporation, Tokyo (JP)

( * ) Notice: Subject to any disclaimer, the term of this patent is extended or adjusted under 35 U.S.C. 154(b) by 0 days.

(21) Appl. No.: 14/034,352

(22) Filed: Sep. 23, 2013

(65) Prior Publication Data

US 2014/0159607 A1    Jun. 12, 2014

(30) Foreign Application Priority Data

Dec. 7, 2012   (JP) .................................. 2012-268414

(51) Int. Cl.
H05B 37/02   (2006.01)
H05B 33/08   (2006.01)

(52) U.S. Cl.
CPC ............. *H05B 33/0857* (2013.01); *Y02B 20/42* (2013.01)
USPC ......................... 315/294; 315/192; 315/200 R

(58) Field of Classification Search
USPC .......... 315/185 R, 192, 200 R, 291, 294, 297, 315/312
See application file for complete search history.

(56) References Cited

U.S. PATENT DOCUMENTS

2009/0015174 A1* 1/2009 Huang et al. ................... 315/250
2011/0068693 A1* 3/2011 Hsu ................................ 315/119
2011/0080117 A1* 4/2011 Peker et al. .................... 315/297

FOREIGN PATENT DOCUMENTS

JP    2011-175793    9/2011

OTHER PUBLICATIONS

Patent Abstracts of Japan, English Abstract of JP2011-175793, http://www19.ipdl.inpit.go.jp/PA1/result/detail/main/wmJeaEaDA423175793P1.htm, Aug. 5, 2013.

* cited by examiner

*Primary Examiner* — Tung X Le
(74) *Attorney, Agent, or Firm* — Studebaker & Brackett PC

(57) ABSTRACT

A lighting apparatus includes a first LED unit and a second LED unit configured to provide different color temperatures. A pulse/voltage conversion circuit is connected between a power supply line and a low-potential side reference line, and configured to convert the pulses of input electric power into a voltage. A voltage dividing circuit is connected between the output terminal of the pulse/voltage conversion circuit and the low-potential side reference line, and configured to divide the voltage converted by the pulse/voltage conversion circuit. The dividing node of the voltage dividing circuit and the low-potential side terminal of the second LED unit are connected.

6 Claims, 15 Drawing Sheets

US 8,872,443 B2

LIGHTING APPARATUS AND CONTROL CIRCUIT

BACKGROUND OF THE INVENTION

1. Field of the Invention

The present invention relates to a lighting apparatus employing LEDs (Light Emitting diode) and a control circuit for the lighting apparatus.

2. Description of the Related Art

In recent years, the replacement of incandescent light bulbs and xenon lamps with LED lighting devices has been accelerating. Typically, dimming of such incandescent light bulbs and xenon lamps is performed by means of a phase control method using a triac. An LED has a problem in that such an LED exhibits a small change in the color of its emitted light according to the change in the current that flows through it, as compared with incandescent light bulbs and xenon lamps. Thus, in a case of employing the same dimming control operation for the dimming of such an LED as that employed for the dimming of incandescent light bulbs and xenon lamps, such an arrangement cannot provide a sufficient light color change. In order to solve such a problem, a technique has been proposed in which a white-color LED and an orange-color LED are employed, and the light emitted from the white-color LED and the light emitted from the orange-color LED are mixed so as to widen the range of light color to be emitted by such an LED device (see Patent document 1, for example).

RELATED ART DOCUMENTS

Patent Documents

[Patent Document 1]
Japanese Patent Application Laid Open No. 2011-175793
In a case in which the dimming control operation is performed using multiple LEDs each configured to emit different colors of light, there is a need to perform a dimming control operation for each of the multiple LEDs configured to emit different colors of light. In order to provide such a function, an arrangement is conceivable in which a microprocessor is employed so as to determine the duty ratio for each color LED according to a dimming ratio specified by the user, and to set the dimming ratio thus determined for each color LED. However, such an arrangement employing such a microprocessor leads to an increased cost, and leads to an increased circuit scale. Furthermore, there is a demand for a general purpose LED lighting apparatus that is compatible with both the PWM control method and the phase control method, i.e., that does not depend on the dimming control method, which does not require employing a microprocessor.

SUMMARY OF THE INVENTION

The present invention has been made in view of such a situation. Accordingly, it is a general purpose of the present invention to provide a technique for performing a lighting control operation in a simple manner for a lighting apparatus comprising LEDs of multiple colors which are combined so as to widen the color reproduction range of the lighting apparatus.

In order to solve the aforementioned problem, a lighting apparatus according to an embodiment of the present invention comprises: a first LED unit connected between a power supply line through which dimming-controlled input electric power passes and a low-potential side reference line; a second LED unit configured to emit light with a color that differs from that emitted by the first LED unit, and arranged such that its high-potential side terminal is connected to the power supply line in parallel with the first LED unit; a conversion unit connected between the power supply line and the low-potential side reference line, and configured to convert the pulses of input electric power into a voltage; and a voltage dividing circuit connected between the output terminal of the conversion unit and the low-potential side reference line, and configured to divide the voltage converted by the conversion unit. A dividing node of the voltage dividing circuit is connected to the low-potential side terminal of the second LED unit.

Another embodiment of the present invention relates to a control circuit. The control circuit is configured to be mounted on a lighting apparatus comprising: a first LED unit connected between a power supply line through which dimming-controlled input electric power passes and a low-potential side reference line; and a second LED unit configured to emit light with a color that differs from that emitted by the first LED unit, and arranged such that its high-potential side terminal is connected to the power supply line in parallel with the first LED unit. The control circuit comprises: a conversion unit connected between the power supply line and the low-potential side reference line, and configured to convert the pulses of input electric power into a voltage; and a voltage dividing circuit connected between the output terminal of the conversion unit and the low-potential side reference line, and configured to divide the voltage converted by the conversion unit. A dividing node of the voltage dividing circuit is connected to the low-potential side terminal of the second LED unit.

It should be noted that any combination of the aforementioned components or otherwise any manifestation of the present invention may be mutually substituted between an apparatus, method, system, and so forth, which are effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Examples of typical dimming control methods include the phase control method, and the PWM (Pulse Width Modulation) control method. Typically, incandescent light bulbs and xenon lamps are each configured as an AC-driven device. Accordingly, the phase control method is widely employed for the dimming control operation for such an incandescent light bulb or such a xenon lamp. A typical LED lighting device is configured as a DC-driven device. Thus, the PWM control method is suitable for, and widely employed for, the dimming control operation for such an LED lighting device. However, in some cases, there is a demand for such an LED device configured to perform the dimming control operation using the phase control method. Examples of such cases include a case in which an existing wiring system is reused, and a case in which a particular kind of dimmer control using the phase control method must be employed from the viewpoint of the overall system. Thus, there is a demand for an LED lighting device that is compatible with both the phase control method and the PWM control method. Description will be made below in the embodiment 1 regarding an LED lighting system employing the PWM control method. Subsequently, description will be made in the embodiment 2 regarding an LED lighting system employing the phase control method.

Figure 1:
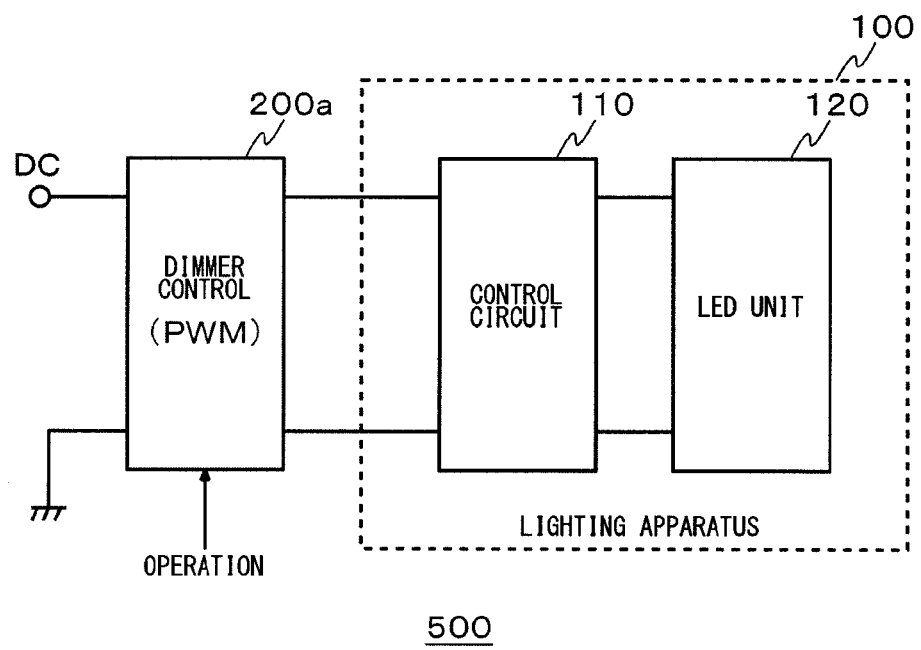
FIG. 1 is a block diagram showing a configuration of a lighting system according to an embodiment 1.

FIG. 1 is a block diagram showing a configuration of a lighting system 500 according to the embodiment 1. The lighting system 500 according to the embodiment 1 includes a dimmer control 200a, and a lighting apparatus 100. Description will be made in the present embodiment assuming that the DC electric power PWM controlled by the dimmer control 200a is input to the lighting apparatus 100 as a power supply. The lighting system 500 is configured to allow the user to specify the dimming ratio for the dimmer control 200a via an unshown operating unit. The dimming ratio thus specified is converted into the duty ratio. With the PWM control method, the amount of light emitted becomes greater as the duty ratio rises.

The lighting apparatus 100 includes a control circuit 110 and an LED unit 120. The control circuit 110 is configured to control the LED unit 120 according to the input electric power thus dimming controlled. The LED unit 120 includes multiple colored LEDs configured to emit light having different color temperatures. The multiple LEDs are arranged such that they are housed in an unshown lighting housing, and configured to provide compound-color light.

Figure 2:
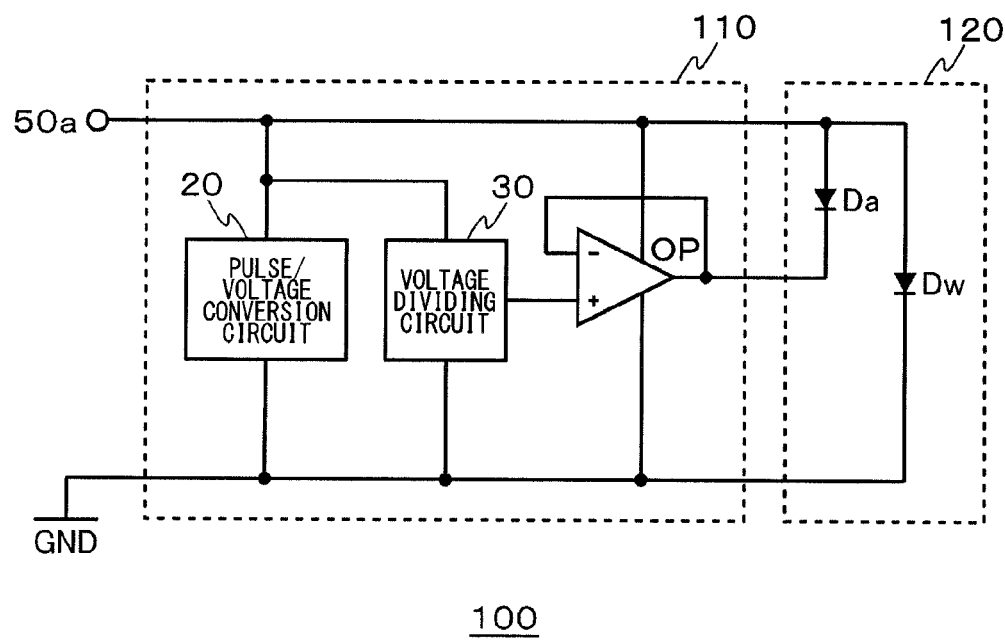
FIG. 2 is a diagram for describing a mechanism of the lighting apparatus according to the embodiment 1.

FIG. 2 is a diagram for describing the mechanism of the lighting apparatus 100 according to the embodiment 1. With the embodiment 1, the LED unit 120 includes multiple LEDs configured to emit different colors, i.e., a white-color LED (Dw), and an orange-color (amber-color) LED (Da). The orange-color LED (Da) has characteristics such that the color temperature of the emitted light is lower than that of the white-color LED (Dw), and the forward voltage drop Vf is lower than that of the white-color LED (Dw). Thus, the orange-color LED (Da) emits light at a voltage that is lower than that of the white-color LED (Dw).

The white-color LED (Dw) is connected between the power supply line through which the input electric power PWM controlled by the dimmer control 200a is supplied, and a low-potential side reference line (description will be made below in the embodiment assuming that the ground line is used as the low-potential side reference line). Specifically, the white-color LED (Dw) is arranged such that its anode side is connected to the power supply line, and its cathode side is connected to the ground line.

The orange-color LED (Da) is connected between the aforementioned power supply line and an output terminal of the operational amplifier OP described later. Specifically, the orange-color LED (Da) is arranged such that its anode side is connected to the power supply line and its cathode side is connected to the output terminal of the operational amplifier OP. As described above, the high-potential side of the white-color LED (Dw) and the high-potential side of the orange-color LED (Da) are connected to the same power supply line in parallel. On the other hand, their low-potential sides are respectively connected to different terminals.

The control circuit 110 includes a pulse/voltage conversion circuit 20, a voltage dividing circuit 30, and an operational amplifier OP. The pulse/voltage conversion circuit 20 is connected between the aforementioned power supply line and the ground line. The pulse/voltage conversion circuit 20 is configured to convert the pulses of electric power input to the lighting apparatus 100 into a voltage. In other words, the pulse/voltage conversion circuit 20 is configured to convert the duty ratio of the input electric power into a voltage. The input electric power is converted into a voltage that rises as the duty ratio of the input electric power rises.

The voltage dividing circuit 30 is connected between the output terminal of the pulse/voltage conversion circuit 20 and the ground line. The voltage dividing circuit 30 is configured to divide, by a predetermined voltage diving ratio, the voltage converted by the pulse/voltage conversion circuit 20.

The operational amplifier OP is arranged such that its non-inverting input terminal is connected to the voltage dividing node of the voltage dividing circuit 30, and its output terminal is connected to the cathode terminal, i.e., a low-potential side terminal, of the orange-color LED (Da). Furthermore, the operational amplifier OP is arranged such that its output terminal and its inverting input terminal are connected. Moreover, the operational amplifier OP is arranged such that its positive power supply terminal is connected to the aforementioned power supply line and its negative power supply terminal is connected to the ground line.

The operational amplifier OP is configured to operate such that its non-inverting input terminal and its inverting input terminal are virtually connected. Thus, the potential becomes the same at the non-inverting input terminal, the inverting input terminal, and the output terminal of the operational amplifier OP. That is to say, the operational amplifier OP functions as a voltage follower. With the present embodiment, the operational amplifier OP is employed to perform sampling of the divided voltage output from the voltage dividing circuit 30 while eliminating the effect of the impedance of the orange-color LED (Da).

As described above, with the lighting apparatus 100 according to the embodiment 1, the voltage dividing node of the voltage dividing circuit 30 and the low-potential side terminal of the orange-color LED (Da) are electrically connected via such a voltage follower. Thus, the divided voltage thus converted by the pulse/voltage conversion circuit 20 is applied to the low-potential side terminal of the orange-color LED (Da). When the orange-color LED (Da) is turned on, the high-side potential of a voltage provided by the conversion operation of the pulse/voltage conversion circuit 20 is determined by the potential of the low-potential side terminal of the orange-color LED (Da). Such a connection configuration provides suitable light color adjustment. Specific description thereof will be made below.

First, when the duty ratio is 100%, only the white-color LED (Dw) emits light. The divided voltage generated by the voltage dividing circuit 30 rises as the duty ratio rises, which reduces the potential difference between both terminals of the orange-color LED (Da). If the potential difference is designed such that it becomes lower than the forward voltage drop Vf of the orange-color LED (Da), such an arrangement allows only the white-color LED (Dw) to emit light in such a state.

When the duty ratio falls, the divided voltage becomes small, which increases the potential difference between both terminals of the orange-color LED (Da). When the potential difference becomes higher than the forward voltage drop Vf of the orange-color LED (Da), the orange-color LED (Da) also emits light. When the current flows through the orange-color LED (Da), the current that flows through the white-color LED (Dw) becomes smaller according to the extent of the increase in the current that flows through the orange-color LED (Da). In this state, the orange-color light increases according to the reduction in the quantity of white-color light, and the overall color of the emitted light becomes slightly reddish. When the current flows through the orange-color LED (Da), the dividing node of the voltage dividing circuit 30 is fixed to the potential at the low-potential side terminal of the orange-color LED (Da). After the potential at the diving node is fixed, the high-side potential of a voltage generated by the pulse/voltage conversion circuit 20 is fixed according to the potential at the dividing node.

When the duty ratio further falls, the divided voltage becomes further smaller. In this state, the current that flows through the orange-color LED (Da) becomes greater, which increases the quantity of orange-color light. On the other hand, the current that flows through the white-color LED (Dw) reduces according to the extent of the increase in the current that flows through the orange-color LED (Da), which reduces the quantity of white color light. Thus, the overall color of the emitted light becomes dark with an increased red color component.

When the duty ratio falls, the voltage generated by the pulse/voltage conversion circuit 20 becomes small. After the dividing node of the voltage dividing circuit 30 is fixed to the potential at the low-potential side terminal of the orange-color LED (Da), the potential at the ground line which functions as the low-potential side rises as the voltage generated by the pulse/voltage conversion circuit 20 becomes smaller. Consequently, the potential difference between both terminals of the white-color LED (Dw) becomes smaller. When the potential difference becomes smaller than the forward voltage drop Vf of the white-color LED (Dw), the white-color LED (Dw) is turned off. In this state, such an arrangement emits only the orange-color light. When the duty ratio is set to 0%, both the white-color LED (Dw) and the orange-color LED (Da) are turned off.

Figure 3:
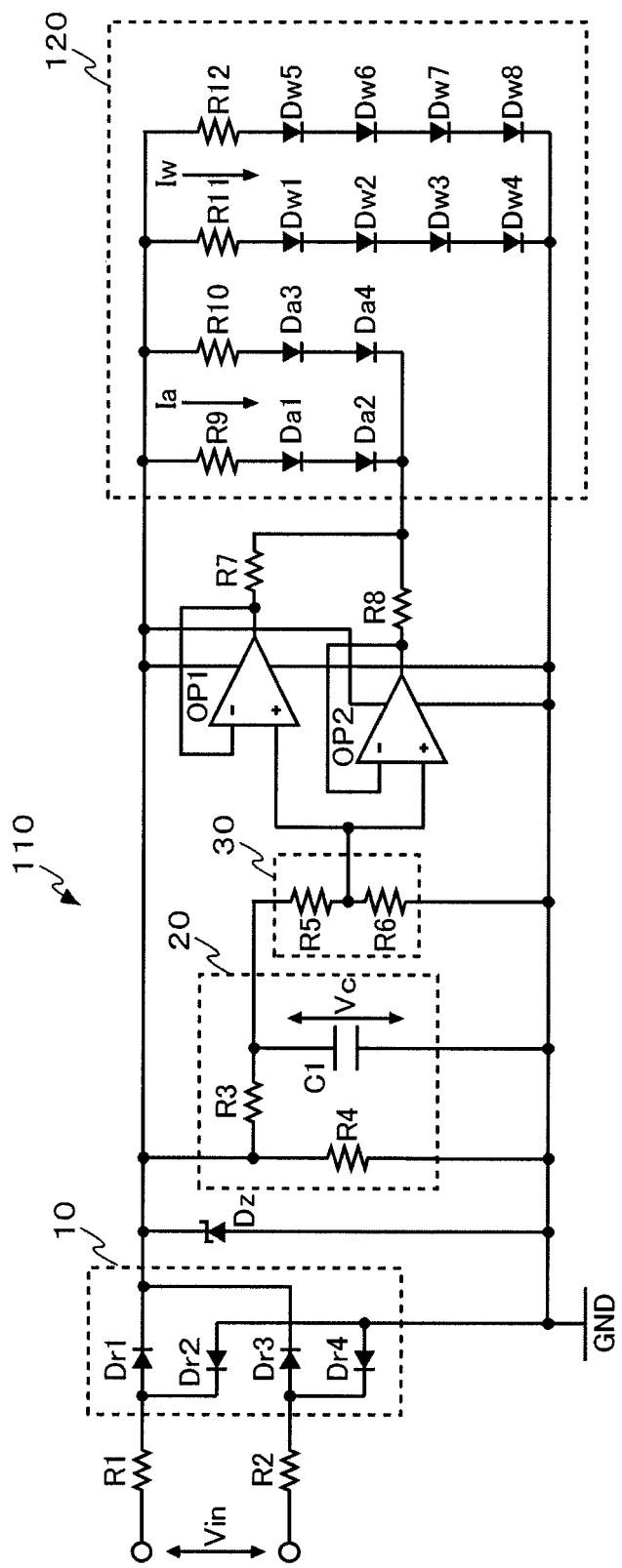
FIG. 3 is a diagram for describing a specific example circuit of the lighting apparatus according to the embodiment 1.

FIG. 3 is a diagram for describing a specific circuit example of the lighting apparatus 100 according to the embodiment 1. With the circuit example, eight white-color LEDs and four orange-color LEDs are employed. A first white-color LED (Dw1), a second white-color LED (Dw2), a third white-color LED (Dw3), and a fourth white-color LED (Dw4) are connected in series. The series connected LED circuit thus obtained is arranged such that its anode side is connected to the power supply line via an eleventh resistor R11, and its cathode side is connected to the ground line. In the same way, a fifth white-color LED (Dw5), a sixth white-color LED (Dw6), a seventh white-color LED (Dw7), and an eighth white-color LED (Dw8) are connected in series. The series connected LED circuit thus obtained is arranged such that its anode side is connected to the power supply line via a twelfth resistor R12, and its cathode side is connected to the ground line. With the present embodiment, each white-color LED (Dw) is configured to have a forward voltage drop Vf of approximately 3.0 V.

A first orange-color LED (Da1) and a second orange-color LED (Da2) are connected in series. The series connected LED circuit thus obtained is arranged such that its anode side is connected to the power supply line via a ninth resistor R9, and its cathode side is connected to the output terminal of a first operational amplifier OP1 and the output terminal of a second operational amplifier OP2 described later. In the same way, a third orange-color LED (Da3) and a fourth orange-color LED (Da4) are connected in series. The series connected LED circuit thus obtained is arranged such that its anode side is connected to the power supply line via a tenth resistor R10, and its cathode side is connected to the output terminal of the first operational amplifier OP1 and the output terminal of the second operational amplifier OP2 described later. With the present embodiment, each orange-color LED (Da) is configured to have a forward voltage drop Vf of approximately 2.3 V.

The control circuit 110 shown in FIG. 3 includes a first resistor R1, a second resistor R2, a full-wave rectifier circuit 10, a Zener diode Dz, a pulse/voltage conversion circuit 20, a voltage dividing circuit 30, a first operational amplifier OP1, a second operational amplifier OP2, a seventh resistor R7, and an eighth resistor R8.

The first resistor R1 is configured as a current limiting resistor configured to limit the current input via the first input terminal of the lighting apparatus 100. The second resistor R2 is configured as a current limiting resistor configured to limit the current input via the second input terminal of the lighting apparatus 100.

The full-wave rectifier circuit 10 is a circuit configured to perform full-wave rectification of AC electric power input via the first input terminal and the second input terminal. The full-wave rectifier circuit 10 is configured as a diode bridge circuit comprising a first rectifier diode Dr1, a second rectifier diode Dr2, a third rectifier diode Dr3, and a fourth rectifier diode Dr4. Description is being made in the first embodiment assuming that PWM-controlled DC electric power is input to the lighting apparatus 100. Thus, such an arrangement basically does not require such a full-wave rectifier circuit 10. However, in order to support an arrangement configured to receive a supply of AC power as in the embodiment 2 as described later, the lighting apparatus 100 includes such a full-wave rectifier circuit 10. Furthermore, such an arrangement is capable of protecting the lighting apparatus 100 from damage if it is reverse-connected to the power supply. Rather, such an arrangement allows the lighting apparatus 100 to operate normally even if it is reverse-connected to the power supply.

The Zener diode Dz is connected between the aforementioned power supply line and the ground line. When a large current that is greater than the rated current flows, the Zener diode Dz is turned on, which protects the LEDs and the other internal components.

The pulse/voltage conversion circuit 20 includes a third resistor R3, a fourth resistor R4, and a capacitor C1. That is to say, with the present embodiment, the pulse/voltage conversion circuit 20 is configured as an RC low-pass filter. The third resistor R3 is arranged such that one terminal thereof is connected to the power supply line, and the other terminal is connected to one terminal of the capacitor C1. The other terminal of the capacitor C1 is connected to the ground line. The fourth resistor R4 is arranged such that one terminal thereof is connected to the power supply line, and the other terminal is connected to the ground line. The connection node that connects the third resistor R3 and the capacitor C1 functions as the output terminal.

The dividing circuit 30 includes a fifth resistor R5 and a sixth resistor R6. The fifth resistor R5 and the sixth resistor R6 are connected in series. The series connected resistor circuit thus obtained is arranged such that one terminal thereof is connected to the connection node that connects the third resistor R3 and the capacitor C1, and the other terminal thereof is connected to the ground line.

The first operational amplifier OP1 is arranged such that its non-inverting input terminal is connected to the connection node that connects the fifth resistor R5 and the sixth resistor R6, and its output terminal is connected to the cathode terminal of the second orange-color LED (Da2) and the cathode terminal of the fourth orange-color LED (Da4) via the seventh resistor R7. Furthermore, the first operational amplifier OP1 is arranged such that its output terminal is connected to its inverting input terminal. Moreover, the first operational amplifier OP1 is arranged such that its positive power supply terminal is connected to the aforementioned power supply line, and its negative power supply terminal is connected to the ground line.

The second operational amplifier OP2 is arranged such that its non-inverting input terminal is connected to the connection node that connects the fifth resistor R5 and the sixth resistor R6, and its output terminal is connected to the cathode terminal of the second orange-color LED (Da2) and the cathode terminal of the fourth orange-color LED (Da4) via the eighth resistor R8. Furthermore, the second operational amplifier OP2 is arranged such that its output terminal is connected to its inverting input terminal. Moreover, the second operational amplifier OP2 is arranged such that its positive power supply terminal is connected to the aforementioned power supply line, and its negative power supply terminal is connected to the ground line. As described above, the first operational amplifier OP1 and the second operational amplifier OP2 each function as a voltage follower.

As described above, the lighting apparatus 100 includes two operational amplifiers connected in parallel in order to ensure the current capacity. Such an arrangement may also include only a single large current capacity operational amplifier. However, in this case, such an arrangement requires a large-size operational amplifier. With an arrangement in which multiple operational amplifiers each having a small current capacity are connected in parallel, such an arrangement permits a reduction in the overall size.

Description will be made below regarding experimental results for the white-color LED current Iw that flows through the white-color LED (Dw) and the orange-color LED current Ia that flows through the orange-color LED (Da) of the lighting apparatus 100 shown in FIG. 3.

Figure 4:
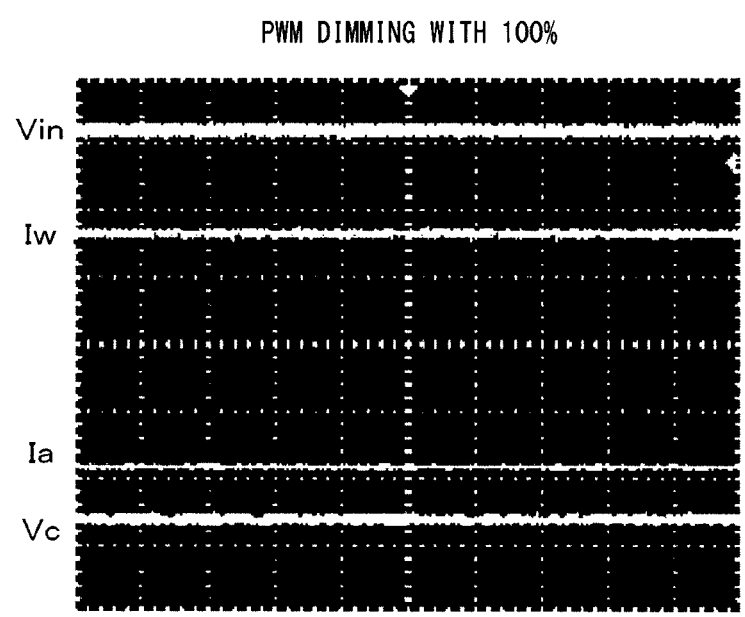
FIG. 4 is a diagram showing the measurement values of the input voltage Vin, the voltage Vc between the terminals of the capacitor C1, the white-color LED current Iw, and the orange-color LED current Ia, when the PWM dimming ratio is set to 100%.

FIG. 4 is a diagram showing the measurement values of the input voltage Vin, the voltage Vc between the terminals of the capacitor C1, the white-color LED current Iw, and the orange-color LED current Ia, when the PWM dimming is performed with a dimming ratio of 100%. The voltage Vc between the terminals of the capacitor C1 represents the voltage waveform after low-pass filtering, and before voltage dividing. The white-color LED current Iw represents the current waveform obtained by means of calculation based on the voltage between the terminals of the eleventh resistor R11, which is a current-limiting resistor for the white-color LED. The orange-color LED current Ia represents the current waveform obtained by means of calculation based on the voltage between the terminals of the ninth resistor R9, which is a current-limiting resistor for the orange-color LED. The voltage Vc between the terminals of the capacitor C1 is higher than a critical voltage at which the orange-color LED is turned on. Thus, in this state, the orange-color LED does not emit light. In this state, only the white-color LED emits light.

Figure 5:
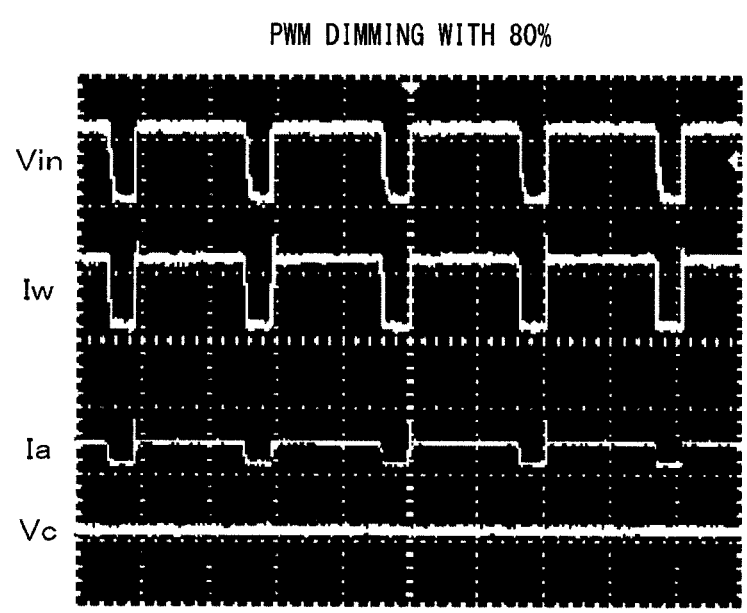
FIG. 5 is a diagram showing the measurement values of the input voltage Vin, the voltage Vc between the terminals of the capacitor C1, the white-color LED current Iw, and the orange-color LED current Ia, when the PWM dimming ratio is set to 80%.

FIG. 5 is a diagram showing the measurement values of the input voltage Vin, the voltage Vc between the terminals of the capacitor C1, the white-color LED current Iw, and the orange-color LED current Ia, when the PWM dimming is performed with a dimming ratio of 80%. The input voltage Vin represents the power supply voltage waveform obtained by a dimming operation using the PWM control method. In this state, the voltage Vc between the terminals of the capacitor C1 falls to a voltage level at which a small amount of current flows through the orange-color LED. The quantity of light emitted from the white-color LED greatly falls, and a small amount of light emitted from the orange-color LED is provided. With such an arrangement, the change in the color of emitted light is started even with a dimming level in a high range.

Figure 6:
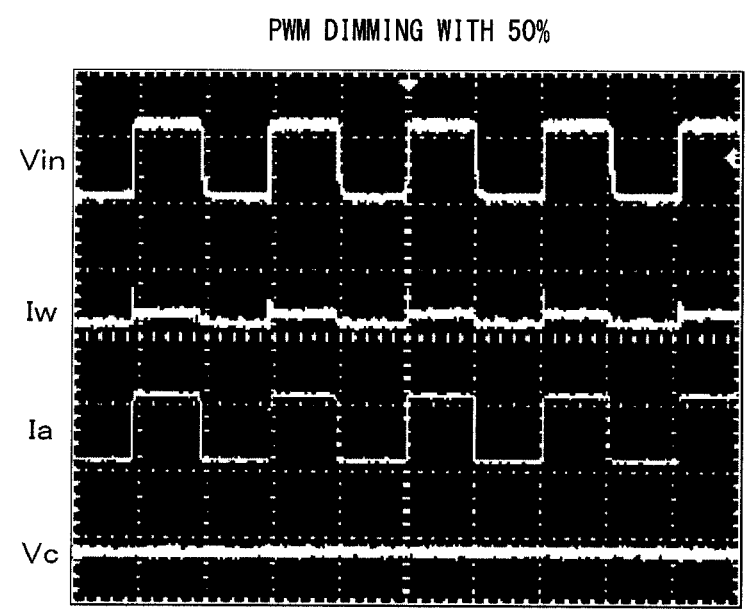
FIG. 6 is a diagram showing the measurement values of the input voltage Vin, the voltage Vc between the terminals of the capacitor C1, the white-color LED current Iw, and the orange-color LED current Ia, when the PWM dimming ratio is set to 50%.

FIG. 6 is a diagram showing the measurement values of the input voltage Vin, the voltage Vc between the terminals of the capacitor C1, the white-color LED current Iw, and the orange-color LED current Ia, when the PWM dimming is performed with a dimming ratio of 50%. In this stage, the voltage Vc between the terminals of the capacitor C1 further falls, which further increases the current that flows through the orange-color LED. Thus, the quantity of light emitted from the white-color LED is extremely small, and the quantity of light emitted from the orange-color LED becomes great. Thus, the orange-color component of the emitted light becomes stronger.

Figure 7:
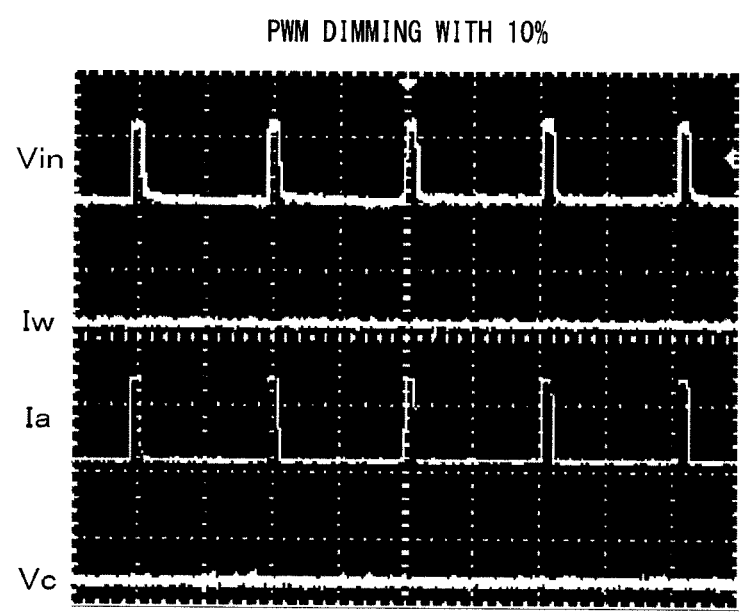
FIG. 7 is a diagram showing the measurement values of the input voltage Vin, the voltage Vc between the terminals of the capacitor C1, the white-color LED current Iw, and the orange-color LED current Ia, when the PWM dimming ratio is set to 10%.

FIG. 7 is a diagram showing the measurement values of the input voltage Vin, the voltage Vc between the terminals of the capacitor C1, the white-color LED current Iw, and the orange-color LED current Ia, when the PWM dimming is performed with a dimming ratio of 10%. The average value of the voltage Vc between the terminals of the capacitor C1 sufficiently falls. In this state, the white-color LED emits almost no light. The PWM dimming control is performed with a PWM value of 10%, and accordingly, the orange-color LED emits a reduced quantity of light.

Figure 8:
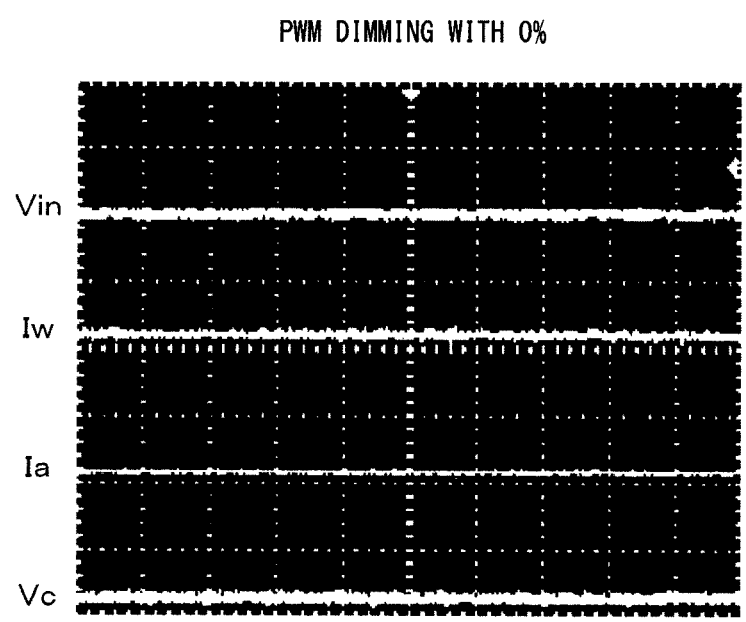
FIG. 8 is a diagram showing the measurement values of the input voltage Vin, the voltage Vc between the terminals of the capacitor C1, the white-color LED current Iw, and the orange-color LED current Ia, when the PWM dimming ratio is set to 0%.

FIG. 8 is a diagram showing the measurement values of the input voltage Vin, the voltage Vc between the terminals of the capacitor C1, the white-color LED current Iw, and the orange-color LED current Ia, when the PWM dimming is performed with a dimming ratio of 0%. A floating voltage remaining at the capacitor C1 is measured, which is regarded as being a measurement error. The white-color LED and the orange-color LED both emit almost no light.

Figure 9:
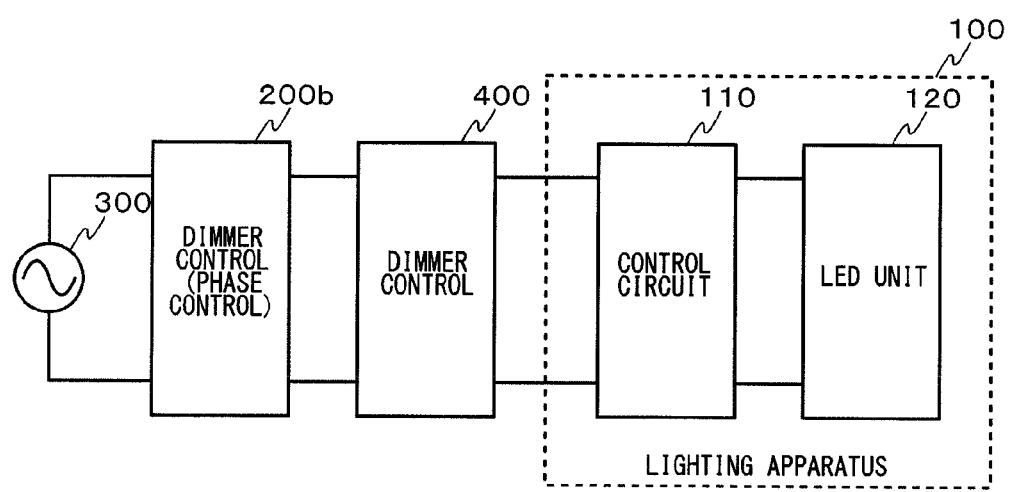
FIG. 9 is a block diagram showing a configuration of a lighting system according to an embodiment 2.

Next, description will be made regarding a lighting system 500 employing a phase control method according to an embodiment 2. FIG. 9 is a block diagram showing a configuration of a lighting system 500 according the embodiment 2. The lighting system 500 according to the embodiment 2 includes a dimmer control 200b, a step-down transformer 400, and the lighting apparatus 100.

The dimmer control 200b includes a triac, and is configured to clip a part of the AC electric power supplied from a commercial power supply 300. Such an arrangement is configured to allow the user to specify the dimming ratio for the dimmer control 200b via an unshown operating unit. The dimmer control 200b is configured to turn on the triac at a timing that corresponds to the dimming ratio thus specified.

Figure 10:
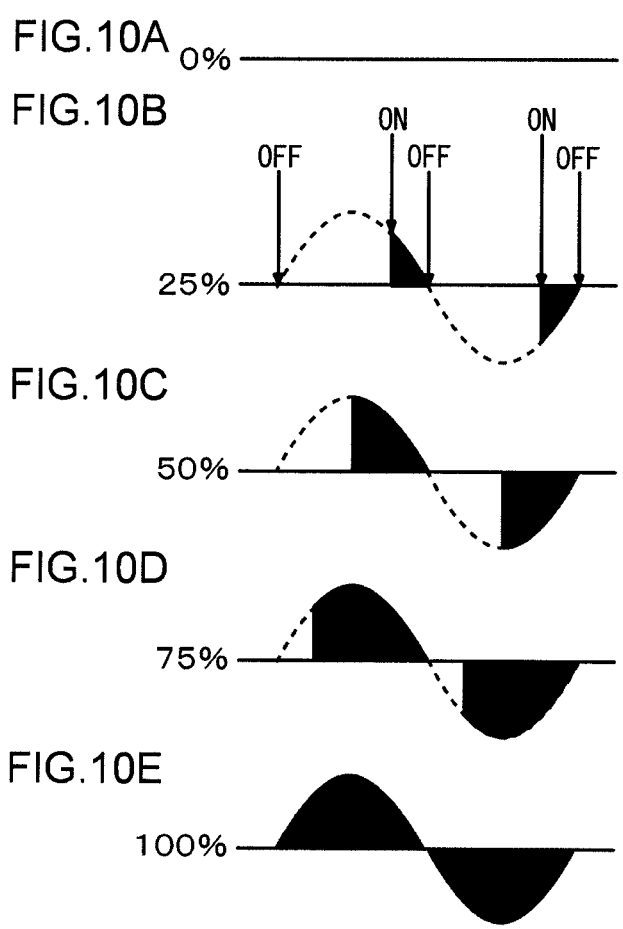
FIGS. 10A through 10E are diagrams each showing a phase-controlled AC waveform.

FIGS. 10A through 10E are diagrams each showing a phase-controlled AC waveform. FIG. 10A shows the waveform when the dimming ratio is set to 0%. FIG. 10B shows the waveform when the dimming ratio is set to 25%. FIG. 10C shows the waveform when the dimming ratio is set to 50%. FIG. 10D shows the waveform when the dimming ratio is set to 75%. FIG. 10E shows the waveform when the dimming ratio is set to 100%.

The step-down transformer 400 is configured to step down the phase-controlled AC voltage. For example, the step-down transformer 400 is configured to step down an AC voltage of 100 V to an AC voltage of 24 V. It should be noted that, in a case in which a lighting apparatus configured with a rated voltage of 100 V or more is employed as the lighting apparatus 100, such an arrangement does not require such a step-down transformer 400.

The lighting apparatus 100 may have the same configuration as shown in FIGS. 2 and 3. With such an arrangement, the electric power to be input to the pulse/voltage conversion circuit 20 is not configured as PWM-controlled DC electric power, but rather phase-controlled AC electric power is input to the pulse/voltage conversion circuit 20. However, the present embodiment employs the same mechanism in which the capacitor C1 is configured to store energy that corresponds to the dimming ratio, and the energy thus stored is converted into a voltage. As described above, with the lighting apparatus 100 according to the present invention, the waveform of the input voltage is not restricted in particular as long as the pulse waveform represents the dimming ratio. Thus, such an arrangement supports dimmer controls with various kinds of output waveforms that differ according to the manufacturer or the type of model.

Description will be made below regarding experimental results for the white-color LED current Iw that flows through the white-color LED (Dw) and the orange-color LED current Ia that flows through the orange-color LED (Da) in a case in which phase-controlled electric power according to the embodiment 2 is input to the lighting apparatus 100 shown in FIG. 3.

Figure 11:
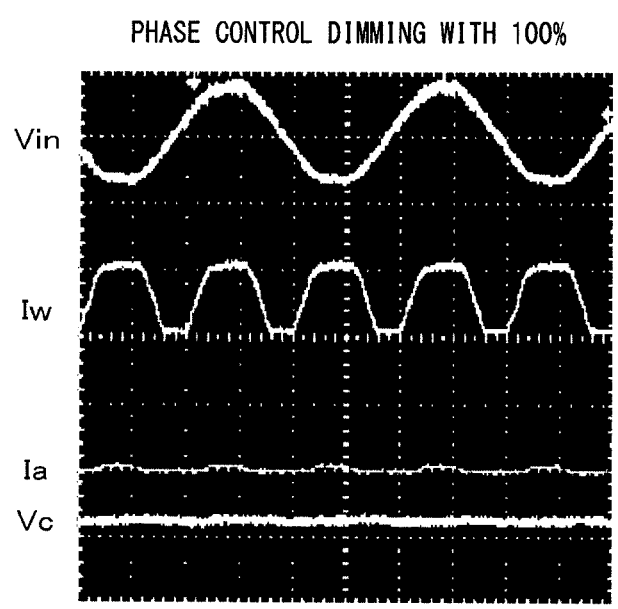
FIG. 11 is a diagram showing the measurement values of the input voltage Vin, the voltage Vc between the terminals of the capacitor C1, the white-color LED current Iw, and the orange-color LED current Ia, when the phase control dimming ratio is set to 100%.

FIG. 11 is a diagram showing the measurement values of the input voltage Vin, the voltage Vc between the terminals of the capacitor C1, the white-color LED current Iw, and the orange-color LED current Ia, when the phase control dimming is performed with a dimming ratio of 100%. The voltage Vc between the terminals of the capacitor C1 represents the voltage waveform after low-pass filtering, and before voltage dividing. The white-color LED current Iw represents the current waveform obtained by means of calculation based on the voltage between the terminals of the eleventh resistor R11, which is a current-limiting resistor for the white-color LED. The orange-color LED current Ia represents the current waveform obtained by means of calculation based on the voltage between the terminals of the ninth resistor R9, which is a current-limiting resistor for the orange-color LED. The voltage Vc between the terminals of the capacitor C1 is higher than a critical voltage at which the orange-color LED is turned on. Thus, in this state, the orange-color LED does not emit light. In this state, only the white-color LED emits light.

Figure 12:
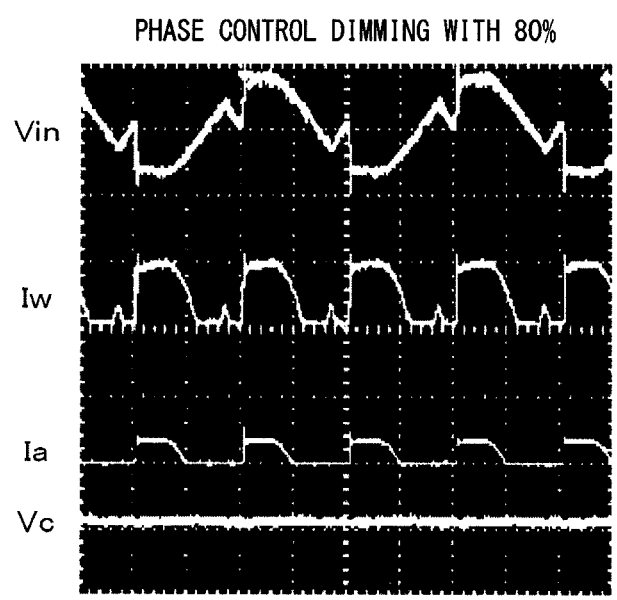
FIG. 12 is a diagram showing the measurement values of the input voltage Vin, the voltage Vc between the terminals of the capacitor C1, the white-color LED current Iw, and the orange-color LED current Ia, when the phase control dimming ratio is set to 80%.

FIG. 12 is a diagram showing the measurement values of the input voltage Vin, the voltage Vc between the terminals of the capacitor C1, the white-color LED current Iw, and the orange-color LED current Ia, when the phase control dimming is performed with a dimming ratio of 80%. The input voltage Vin represents the power supply voltage waveform obtained by a dimming operation using the phase control method. In this state, the voltage Vc between the terminals of the capacitor C1 falls to a voltage level at which a small amount of current flows through the orange-color LED. The quantity of light emitted from the white-color LED greatly falls, and a small amount of light emitted from the orange-color LED is provided. With such an arrangement, the change in the color of emitted light is started even with a dimming level in a high range.

Figure 13:
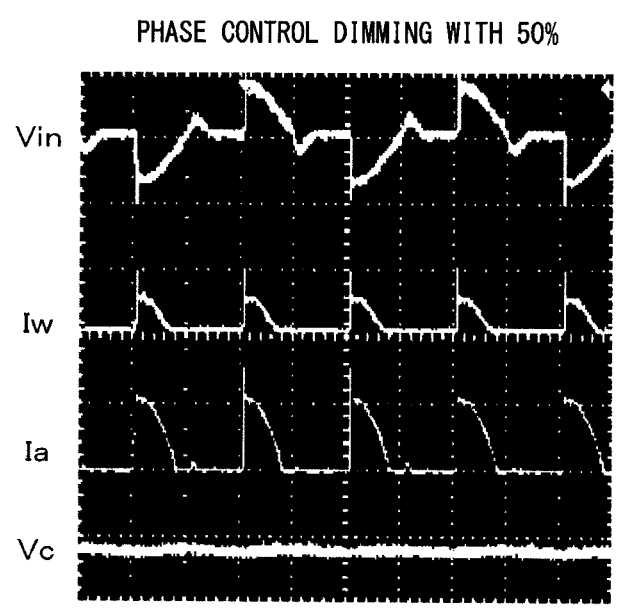
FIG. 13 is a diagram showing the measurement values of the input voltage Vin, the voltage Vc between the terminals of the capacitor C1, the white-color LED current Iw, and the orange-color LED current Ia, when the phase control dimming ratio is set to 50%.

FIG. 13 is a diagram showing the measurement values of the input voltage Vin, the voltage Vc between the terminals of the capacitor C1, the white-color LED current Iw, and the orange-color LED current Ia, when the phase control dimming is performed with a dimming ratio of 50%. In this stage, the voltage Vc between the terminals of the capacitor C1 further falls, which further increases the current that flows through the orange-color LED. Thus, the quantity of light emitted from the white-color LED is extremely small, and the quantity of light emitted from the orange-color LED becomes great. Thus, the orange-color component of the emitted light becomes stronger.

Figure 14:
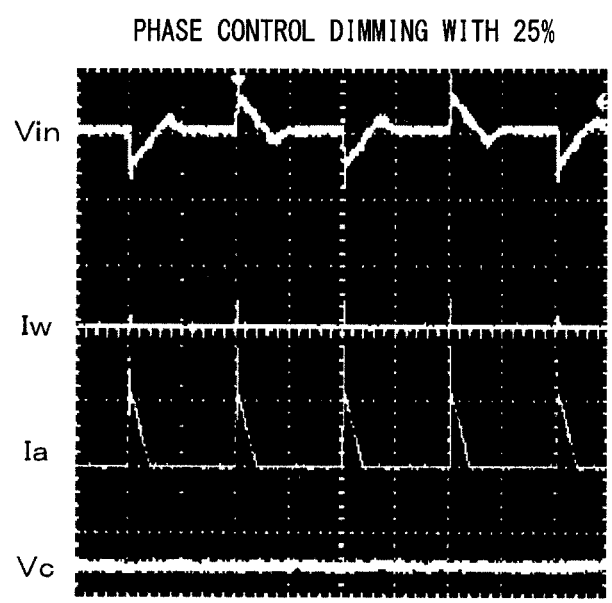
FIG. 14 is a diagram showing the measurement values of the input voltage Vin, the voltage Vc between the terminals of the capacitor C1, the white-color LED current Iw, and the orange-color LED current Ia, when the phase control dimming ratio is set to 25%.

FIG. 14 is a diagram showing the measurement values of the input voltage Vin, the voltage Vc between the terminals of the capacitor C1, the white-color LED current Iw, and the orange-color LED current Ia, when the phase control dimming is performed with a dimming ratio of 25%. The voltage Vc between the terminals of the capacitor C1 sufficiently falls. In this state, the white-color LED emits almost no light.

Figure 15:
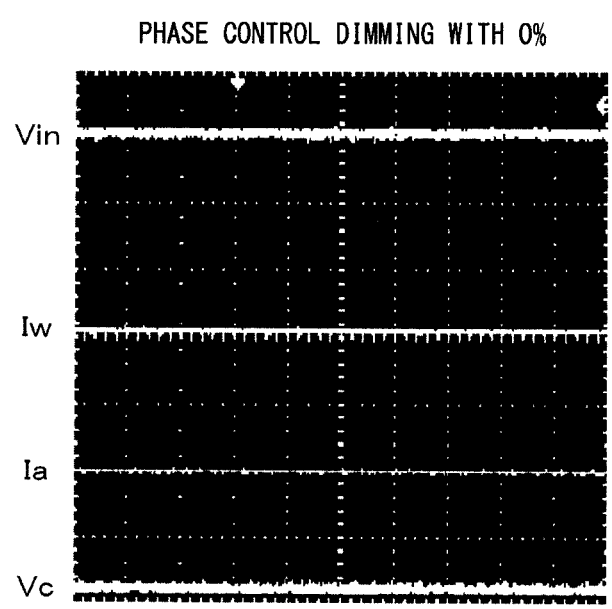
FIG. 15 is a diagram showing the measurement values of the input voltage Vin, the voltage Vc between the terminals of the capacitor C1, the white-color LED current Iw, and the orange-color LED current Ia, when the phase control dimming ratio is set to 0%.

FIG. 15 is a diagram showing the measurement values of the input voltage Vin, the voltage Vc between the terminals of the capacitor C1, the white-color LED current Iw, and the orange-color LED current Ia, when the phase control dimming is performed with a dimming ratio of 0%. A floating voltage remaining at the capacitor C1 is measured, which is regarded as being a measurement error. The white-color LED and the orange-color LED both emit almost no light.

By making a comparison between the dimming control operation using the PWM control method shown in FIGS. 4 through 8 and the dimming control operation using the phase control method shown in FIGS. 11 through 15, it can be understood that these two dimming control operations provide approximately the same functions.

As described above, with the embodiments 1 and 2 according to the present invention, by combining the white-color LEDs and the orange-color LEDs, such an arranging allows an LED lighting apparatus to provide a suitable light color adjustment capability, like the color adjustment provided by a xenon lamp. Such an arrangement provides such a suitable light color adjustment using analog components alone without using a microprocessor. Thus, such an arrangement allows the cost to be greatly reduced, and provides a reduced circuit area, as compared with an arrangement employing digital components. In addition, such an arrangement does not require a clock signal to be supplied to a digital component, thereby providing reduced power consumption.

Furthermore, the embodiments 1 and 2 according to the present invention are applicable to both the PWM control method and the phase control method. That is to say, such an arrangement provides high compatibility. Specifically, a dimmer control using the phase control method, which is employed for an existing incandescent light bulb or a xenon lamp, and a dimmer control using the PWM control method, which is employed for an LED lighting apparatus configured to emit single-color light at all times, can be employed for the lighting apparatus 100 without modification.

Furthermore, with the embodiments 1 and 2 according to the present invention, the circuit is configured to automatically adjust the energy to be supplied to each color LED group while maintaining the consumed electric power within the range of the rated electric power. Thus, such an arrangement allows the user to change the color of the emitted light without wasted energy. Furthermore, with the embodiments, LEDs each having a low forward voltage drop Vf (orange-color LEDs in the aforementioned examples) are turned on. This provides an increased load component in the vicinity of the zero-crossing point, as compared with conventional LEDs. Thus, such an arrangement narrows the range of the conditions in which flicker occurs even if the phase control method is employed.

Furthermore, by adjusting the voltage dividing ratio set for the voltage dividing circuit 30, such an arrangement allows the sensitivity of the light color adjustment to be adjusted as desired. Specifically, in a case in which the voltage dividing ratio is reduced, the orange-color LEDs are turned on at an advanced timing. This provides a light-emission color including an increased red component. Conversely, in a case in which the voltage dividing ratio is raised, the orange-color LEDs are turned on at a delayed timing. This provides a light-emission color including a reduced red component. In a case in which the fifth resistor R5 and the sixth resistor R6 are each configured as a variable resistor, by adjusting the volume of the fifth resistor R5 and the sixth resistor R6, such an arrangement allows the sensitivity of the light color adjustment to be adjusted even after the lighting apparatus 100 is configured. It should be noted that, by adjusting the forward voltage drop Vf of the white-color LED or the forward voltage drop Vf of the orange-color LED, such an arrangement provides a similar sensitivity adjustment. As described above, such an arrangement allows the sensitivity of the light color adjustment to be adjusted in a simple manner. Thus, such an arrangement allows the color of the emitted light to be changed in a simple manner like an arrangement employing an incandescent light bulb.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components, which are also encompassed in the technical scope of the present invention.

The kind of each LED and the number of LEDs included in the LED unit 120 can be determined by the designer as desired. For example, an arrangement may be made in which three or more LED circuits configured to emit different colors of light are connected in parallel. With such an arrangement, multiple voltage dividing nodes are provided to the voltage dividing circuit 30. Also, the number of the same colored LEDs that form the series connected LED circuit can be determined by the designer as desired. Also, the number of LED lines connected in parallel can be determined by the designer as desired.

The circuit configuration of the pulse/voltage conversion circuit 20 is not restricted to such an RC low-pass filter circuit configuration. Rather, any circuit configuration may be employed as long as it is configured to store energy supplied in the form of pulses, and to convert the energy thus stored into a voltage. Also, any circuit configuration may be employed as long as it is configured to perform such a similar operation. Examples of such a circuit configuration providing such a similar operation include a combination of a photo-coupler and a capacitor, and a combination of an electric motor and a flywheel.

What is claimed is:

1. A lighting apparatus comprising:
   a first LED (Light Emitting Diode) unit connected between a power supply line through which dimming-controlled input electric power passes and a low-potential side reference line;
   a second LED unit configured to emit light with a color that differs from that emitted by the first LED unit, and arranged such that its high-potential side terminal is connected to the power supply line in parallel with the first LED unit;
   a conversion unit connected between the power supply line and the low-potential side reference line, and configured to convert the pulses of input electric power into a voltage; and
   a voltage dividing circuit connected between the output terminal of the conversion unit and the low-potential side reference line, and configured to divide the voltage converted by the conversion unit,
   wherein a dividing node of the voltage dividing circuit is connected to the low-potential side terminal of the second LED unit via a voltage follower.

2. The lighting apparatus according to claim 1, wherein the dividing node of the voltage dividing circuit and the low-potential side terminal of the second LED unit are connected via a voltage follower.

3. The lighting apparatus according to claim 1, wherein the second LED unit has characteristics such that the color temperature of its emitted light is lower than that of the first LED unit, and its forward voltage drop is lower than that of the first LED unit.

4. The lighting apparatus according to claim 1, further comprising a full-wave rectifier circuit as an input stage.

5. The lighting apparatus according to claim 1, configured to receive, as an input power supply, electric power which is dimming-controlled by a dimmer control using a PWM (Pulse Width Modulation) control method or a phase control method.

6. A control circuit to be mounted on a lighting apparatus, wherein the lighting apparatus comprises:
- a first LED unit connected between a power supply line through which dimming-controlled input electric power passes and a low-potential side reference line; and
- a second LED unit configured to emit light with a color that differs from that emitted by the first LED unit, and arranged such that its high-potential side terminal is connected to the power supply line in parallel with the first LED unit, and wherein the control circuit comprises:

a conversion unit connected between the power supply line and the low-potential side reference line, and configured to convert the pulses of input electric power into a voltage; and a voltage dividing circuit connected between the output terminal of the conversion unit and the low-potential side reference line, and configured to divide the voltage converted by the conversion unit, and wherein a dividing node of the voltage dividing circuit is connected to the low-potential side terminal of the second LED unit via a voltage follower.

* * * * *